Jan. 2, 1940.    S. BOHTE    2,185,583
AUXILIARY SECURING MEANS FOR BEEF WRAPPERS
Filed March 15, 1939

Inventor:
Steven Bohte
By Martin E. Anderson
Attorney

UNITED STATES PATENT OFFICE 2,185,583

AUXILIARY SECURING MEANS FOR BEEF WRAPPERS

Steven Bohte, Denver, Colo.

Application March 15, 1939, Serial No. 262,076

6 Claims. (Cl. 99—174)

This invention relates to improvements in means for wrapping beef and has reference more particularly to an auxiliary device to be used in connection with beef wrappers of the type shown and described in United States Letters Patent No. 1,506,599, granted to J. P. Murphy, August 26, 1924.

It has been found that the layer of fat directly beneath the skin of an animal and which is exposed to view after the hide has been removed, hardens to a rough, irregular surface when the carcass cools. This rough surface, although it does not in any way effect the quality of the meat, detracts somewhat from its appearance, and is therefore objectionable.

In the patent above identified, it has been explained how the surface of a beef carcass can be made smooth by applying to it, while it is still warm, a covering of cloth, which is stretched tight and held in place until the carcass cools.

The method of obtaining smooth surfaces on beef carcasses has proved very successful in operation. But there is one feature that must be remedied before the most desirable results can be obtained.

If the outer surface of a beef carcass were entirely smooth, the method described in the patent above identified would be sufficient, but it is found that the beef carcass presents one or more depressions in its surface, and when the cloth is stretched over the carcass, it will not contact with these depressed areas with the result that the surface will not be smoothed in the same way, or to the same extent as where the cloth comes in actual contact with the surface. Such depressed areas also appear to form gas pockets and sometimes this gas is generated in sufficient quantities to loosen the cloth covering for considerable distances around the edges of the depressed areas. It has been found that the meat adjacent to such depressed area, which has been held in contact with generated gas, has deteriorated somewhat by the time the covering is removed and since such depressed areas are nearly always located where sirloin, porterhouse and T bone steaks are cut, they effect the most valuable portions of the beef and it is therefore highly desirable to provide means for obviating the damage resulting from the condition above mentioned.

It is the object of my invention to provide a simple device that can be attached to the beef and which is provided with a spring pressed arm carrying a pressure member of spherical outer surface which engages the cloth covering above the depressed area and forces it into contact with the surface of the carcass at this point.

Experiments have shown that where my device has been applied in such a way as to force the cloth into contact with the carcass, the meat at this point will not be injured and the surface will be smooth and conform in every respect to the other portions of the carcass.

Having thus set out the objects of my invention and in a general way defined the means employed for effecting the objects, the invention will now be described in detail, and for this purpose reference will be had to the accompanying drawing in which it has been illustrated and in which.

Figure 1:
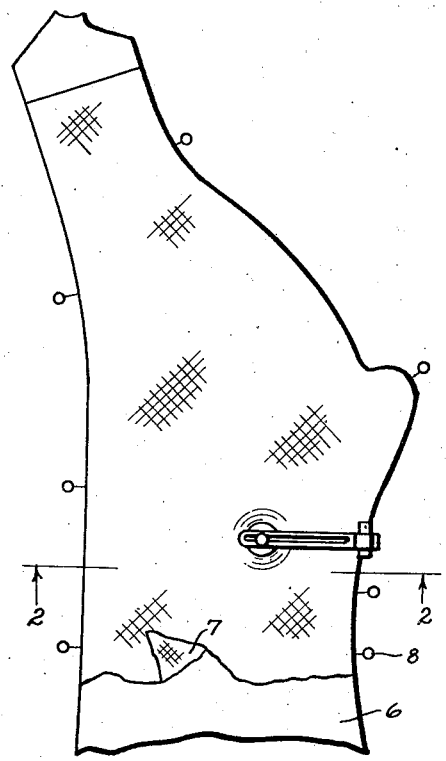
Figure 1 is a side elevation of half of a beef carcass showing a cloth covering in place thereon and showing also my improved device in position.

In the drawing reference numeral 6 designates a beef carcass to which a cloth covering 7 has been secured by means of pins 8 in the manner shown and described in the patent above identified. If the surface of the carcass were convex or entirely smooth, the cloth would adhere to every portion thereof, but it has been found that in the vicinity where the higher priced cuts of beef are taken, there is nearly always a depressed area, such as has been designated by reference numeral 8' in Figure 2A.

It is obvious that when a cloth is stretched over such a depressed area, it cannot contact with the depressed surfaces, but will extend from the high points surrounding the area. As above intimated, it is my object to produce a device by means of which the cloth can be forced into engagement with the surface of a depressed area and such a device has been shown in position in Figure 2.

Figure 3:
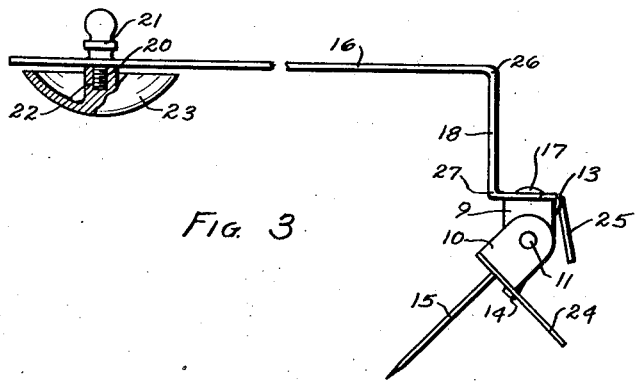
Figure 3 is a side elevation of my improved auxiliary securing means.
Figure 4:
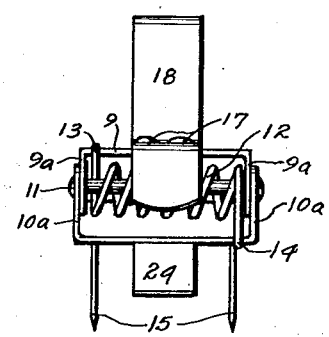
Figure 4 is an end elevation thereof.
Figure 5:
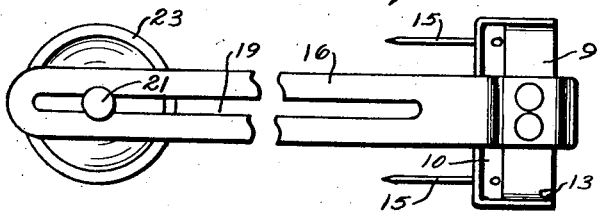
Figure 5 is a top plan view.

Referring now more particularly to Figures 3, 4 and 5, it will be seen that this auxiliary securing device comprises two substantially identically shaped members 9 and 10, each of which has a straight portion with its ends bent at right angles so as to form an elongated U. The part 9 is somewhat shorter than the part 10 so that its ends 9a extend between ends 10a of the other member. The ends 9a and 10a are provided with openings for the reception of a pivot 11. The pivot is provided with a coil spring 12, one end of which overlaps the upper surface of part 9 as indicated at 13 and the other end projects beneath the part 10, as indicated at 14. The straight portion 10 is provided with two spaced spikes 15, by means of which the device is anchored to the carcass. An arm 16 is attached to the part 9 by means of rivets 17 and has a portion 18 thereof that extends at right angles with the surface of part 9 and is then bent at right angles to form the arm portion 16. The elongated arm portion 16 has a slot 19 extending longitudinally thereof and through which a bolt 20 extends. The bolt 20 is secured to a knob 21 and has threaded engagement with an opening in the central portion 22 of the spherical presser member 23. The knob 21 serves as a convenient means for raising and lowering the arm and for adjusting the position of the presser member. When the presser member has been properly positioned, knob 21 can be rotated to clamp it in position. The spring 12 is tensioned in such a way that the spring tends to move the spikes 15 upwardly when viewed as in Figure 3 and therefore when the device is in position, the action of the spring serves to urge the arm 16 against the outer surface of the carcass. A short bar 24 is riveted or otherwise secured to the part 10 and serves as a handle for use in tensioning the spring. The end of the arm that projects to the right of member 16 in Figure 3 is bent downwardly as indicated by reference numeral 25 and serves as a shield to protect the fingers of the operator from coming into engagement with the spring 12 and is also of assistance in tensioning the spring.

Although the arm has been shown as provided with two right angle turns 26 and 27, this is not an essential feature of the construction, as it is possible to substitute an arm having a gradual curve of such shape and curvature that the arm will be kept out of engagement with the carcass surface and the specific shape of this presser arm is therefore to be considered as illustrative only.

Figure 2A:
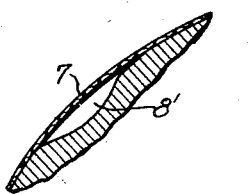
Figure 2A is a fragmentary section corresponding to Figure 2 and shows how the cloth will normally stretch across a depressed area.
Figure 2:
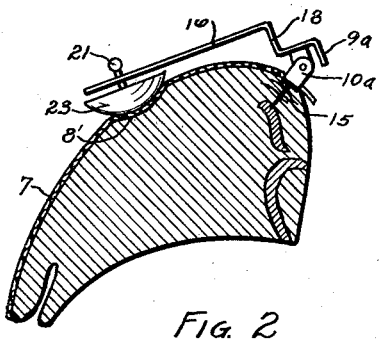
Figure 2 is a section taken on line 2—2, Figure 1.

Let us now assume that the cloth 7 has been stretched over the carcass in accordance with the teachings of the patent above identified, and that the carcass has a depressed area 8, which is not contacted by the cloth, but which is separated therefrom in the manner shown in Figure 2A. The spikes 15 are inserted into the carcass somewhat as shown in Figure 2 and are positioned in the bones and gristles at this point so as to be quite rigidly held. The presser member 23 is then adjusted to the center of the depressed area and the arm released so as to permit the spring to exert its force tending to press the cloth into engagement with the carcass, whereupon the parts will assume the position shown in Figure 2.

From the above description it will be apparent that I have produced a simple device by means of which the cloth covering can always be brought into engagement with the surface of depressed areas of beef carcasses so that every portion of the area will be benefitted equally from such covering.

Having described the invention what is claimed as new is:

1. In combination a beef carcass having a depressed area in its outer surface, a cloth stretched over the outer surface of the carcass and secured thereto along its edges, and means for pressing the cloth into contact with the surface of the depressed area, said means comprising an arm having one end resiliently attached to the carcass and projecting over the depressed area, and means on said arm for engaging the cloth surface to exert pressure thereon.

2. A device for urging a carcass cover cloth into contact with the surface of a depressed area in the carcass surface, comprising, in combination, an anchor member provided with spikes for attaching it to the carcass, an arm pivotally attached to the anchor member, and means comprising a spring for exerting a force on the arm to turn it about its pivot.

3. A device for urging a carcass cover cloth into contact with the surface of a depressed area in the carcass surface, comprising in combination, an anchor member provided with spikes for attaching it to a carcass, an elongated arm hingedly connected with the anchor member, said arm extending over the depressed area in the carcass surface when the device is in position on a carcass, spring means tending to rotate the arm about its pivot, and a pressure member adjustably attached to the arm.

4. A device for urging a carcass cover cloth into contact with the surface of a depressed area in the carcass surface, comprising in combination, an anchor member provided with spikes for attaching it to a carcass, an elongated arm hingedly connected with the anchor member, said arm extending over the depressed area in the carcass surface when the device is in position on a carcass, spring means tending to rotate the arm about its pivot, the arm having a slot extending longitudinally thereof, and a pressure member having a convex surface attached to the arm by means comprising a bolt passing through the slot whereby it can be moved longitudinally on the arm.

5. A device for urging a carcass cover cloth into contact with the surface of a depressed area in the carcass surface, comprising in combination, an anchor member having a straight portion and ends extending at right angles therefrom and in the same direction, a plurality of spikes attached to the straight portion and extending in the opposite direction from that of the ends, the spaced ends having openings, a pivot pin extending through the openings, an arm movably attached to the pivot, a spring enclosing the pivot, one end being in engagement with the straight portion of the anchor member and the other being in operative engagement with the arm, said spring tending to rotate the arm about the pivot, and a pressure member adjustably attached to the arm.

6. A device for urging a carcass cover cloth into contact with the surface of a depressed area in the carcass surface, comprising in combination, an anchor member having a straight portion and ends extending at right angles therefrom and in the same direction, a plurality of spikes attached to the straight portion and extending in the opposite direction from that of the ends, the spaced ends having openings, a member of substantially the same shape as the anchor member, a pivot pin extending through the openings in the ends of two members, the last mentioned member having an arm attached to the straight portion thereof, a spring encircling the pivot with one end engaging the straight portion of the anchor member and the other end engaging the said second member, the arm having movably attached thereto a pressure member having a convex surface.

STEVE BOHTE.